US011048598B2

(12) United States Patent
Neichev et al.

(10) Patent No.: US 11,048,598 B2
(45) Date of Patent: Jun. 29, 2021

(54) ENHANCED DISASTER RECOVERY PROCEDURE OF APPLICATIONS IN A CLOUD ENVIRONMENT

(71) Applicant: SAP SE, Walldorf (DE)

(72) Inventors: Nikolai Veselinov Neichev, Sofia (BG); Todor Stefanov Stoyanov, Sofia (BG); Georgi Yordanov Enchev, Gorna Oryachovitsa (BG); Petar Rusev Rusev, Sofia (BB); Kaloyan Stefanov Nikov, Sofia (BG); Stoyan Zhivkov Boshev, Sofia (BG)

(73) Assignee: SAP SE, Walldorf (DE)

( * ) Notice: Subject to any disclaimer, the term of this patent is extended or adjusted under 35 U.S.C. 154(b) by 183 days.

(21) Appl. No.: 16/368,076

(22) Filed: Mar. 28, 2019

(65) Prior Publication Data

US 2020/0310928 A1 Oct. 1, 2020

(51) Int. Cl.
*G06F 11/20* (2006.01)
*H04L 29/14* (2006.01)
*G06F 11/14* (2006.01)
*H04L 29/08* (2006.01)

(52) U.S. Cl.
CPC ...... *G06F 11/2023* (2013.01); *G06F 11/1464* (2013.01); *H04L 67/1034* (2013.01); *H04L 69/40* (2013.01)

(58) Field of Classification Search
CPC .............. G06F 11/2028; G06F 11/203; G06F 11/2048; G06F 11/2023; G06F 11/2033
See application file for complete search history.

(56) References Cited

U.S. PATENT DOCUMENTS 9,772,916 B2 * 9/2017 Rangasamy ............ G06F 11/00

* cited by examiner

*Primary Examiner* — Amine Raid
(74) *Attorney, Agent, or Firm* — Buckley, Maschoff & Talwalkar LLC

(57) ABSTRACT

A disaster recovery data store may contain an operator-defined parallel account failover value. A disaster recovery service platform may establish a primary region as an active region and determine that a potential disaster has occurred in connection with the primary region. A warm-up process may be initiated causing a pool of virtual machines to begin execution at a secondary region. The platform may then determine that an actual disaster has occurred in connection with the primary region and simultaneously execute disaster recovery failover procedures from the primary region to the secondary region for multiple accounts in parallel based on the operator-defined parallel account failover value. Before all failover procedures are complete, the platform may transmit at least one intermediate failover report. After all failover procedures are complete, the platform may transmit a final failover report and establish the secondary region as the active region using the pool of virtual machines.

21 Claims, 15 Drawing Sheets

INTERMEDIATE DC FAILOVER REPORT

600

| | |
|---|---|
| Primary DC: | primary.account.com |
| Secondary DC: | secondary.account.com |
| Failover Duration: | 180 Seconds |
| DR Operator: | |
| Failover Process ID: | 28944 |
| Total DR Accounts: | 11 |
| Succeeded Accounts: | 7 |
| Failed Accounts: | 1 |
| Timed Out Accounts: | 0 |
| Running Accounts: | 0 |
| Pending Accounts: | 0 |

⎱ 610

Accounts Summary

| | Account | Process ID | Status | Running Time |
|---|---|---|---|---|
| 1 | fdtest01 | 28961 | SUCCESS | 59 Seconds |
| 2 | fdtest01 | 28968 | FAIL | 181 Seconds |
| 3 | fdtest01 | 28975 | SUCCESS | 61 Seconds |
| 4 | fdtest01 | 29132 | SUCCESS | 30 Seconds |
| 5 | fdtest01 | 29139 | SUCCESS | 31 Seconds |
| 6 | fdtest01 | 29273 | SUCCESS | 53 Seconds |
| 7 | fdtest01 | 29280 | SUCCESS | 53 Seconds |
| 8 | fdtest01 | 29287 | SUCCESS | 53 Seconds |
| 9 | fdtest01 | Null | PENDING | 0 Seconds |
| 10 | fdtest01 | Null | PENDING | 0 Seconds |
| 11 | fdtest01 | Null | PENDING | 0 Seconds |

ENHANCED DISASTER RECOVERY PROCEDURE OF APPLICATIONS IN A CLOUD ENVIRONMENT

FIELD

Some embodiments are associated with disaster recovery. In particular, some embodiments provide for an enhanced disaster recovery procedure of applications in a cloud environment.

BACKGROUND

An enterprise may use a cloud computing offering to run applications and/or to provide services. For example, a Platform-As-A-Service offering might process purchase orders, perform human resources functions, etc. The cloud computing offering might be executed, for example, by virtual machines at a data center that is physically located at a first region or landscape. In the case of a catastrophic failure at the first region (e.g., a man made or natural disaster), it may be necessary to migrate the enterprise services to a second "backup" region. Such a task is referred to as a Disaster Recovery Procedure ("DRP").

Some of the metrics, or Key Performance Indicators ("KPI") associated with a DRP include a Recovery Point Objective ("RPO") and a Recovery Time Objective ("RTO"). The challenge is to have both a relatively short RTO along with a minimal RPO. Achieving these goals, however, can be a complex, time consuming, and error-prone task. It may therefore be desirable to provide systems and methods to facilitate an automated enhanced disaster recovery procedure in an accurate and efficient manner.

SUMMARY OF THE INVENTION

According to some embodiments, systems, methods, apparatus, computer program code and means are provided to facilitate an automated enhanced disaster recovery procedure in an accurate and efficient manner. In some embodiments, a disaster recovery data store may contain an operator-defined parallel account failover value. A disaster recovery service platform may establish a primary region as an active region and determine that a potential disaster has occurred in connection with the primary region. A warm-up process may be initiated causing a pool of virtual machines to begin execution at a secondary region. The platform may then determine that an actual disaster has occurred in connection with the primary region and simultaneously execute disaster recovery failover procedures from the primary region to the secondary region for multiple accounts in parallel based on the operator-defined parallel account failover value. Before all failover procedures are complete, the platform may transmit at least one intermediate failover report. After all failover procedures are complete, the platform may transmit a final failover report and establish the secondary region as the active region using the pool of virtual machines.

Some embodiments comprise: means for establishing the primary region as an active region; means for determining that a potential disaster has occurred in connection with the primary region; means for initiating a warm-up process causing a pool of virtual machines to begin execution at the secondary region; means for determining that an actual disaster has occurred in connection with the primary region; means for simultaneously executing disaster recovery failover procedures from the primary region to the secondary region for multiple accounts in parallel based on an operator-defined parallel account failover value retrieved from a disaster recovery data store; before all failover procedures are complete, means for transmitting at least one intermediate failover report; after all failover procedures are complete, means for transmitting a final failover report; and means for establishing the secondary region as the active region using the pool of virtual machines.

In some embodiments, a communication device associated with a secure disaster recovery service platform exchanges information in connection with one or more interactive graphical user interfaces. The information may be exchanged, for example, via public and/or proprietary communication networks.

Technical effects of some embodiments of the invention are improved and computerized ways to facilitate an automated enhanced disaster recovery procedure in an accurate and efficient manner. With these and other advantages and features that will become hereinafter apparent, a more complete understanding of the nature of the invention can be obtained by referring to the following detailed description and to the associated drawings appended hereto.

BRIEF DESCRIPTION OF THE DRAWINGS

FIG. 6 is an intermediate report in accordance with some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
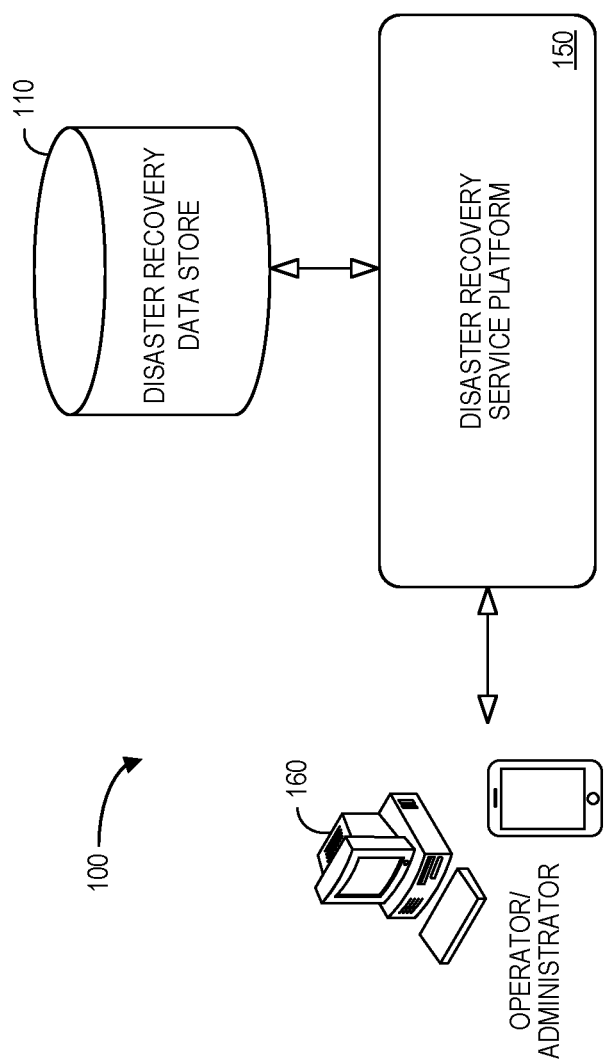
FIG. 1 is a block diagram of a disaster recovery system according to some embodiments.

Implementing a DRP may include preparation of a standby setup (e.g., during an onboarding process). Some embodiments described herein provide an enhanced DRP for cloud platform integration. The enhanced DRP may restore a client's productive setup in an accurate and efficient manner. For example, FIG. 1 is a block diagram of a disaster recovery system 100 according to some embodiments. In particular, the system 100 includes a disaster recovery data store 110 (e.g., containing electronic records including an operator-defined parallel account failover value, a timeout value, etc.), a disaster recovery service platform 150, and a remote operator or administrator computer 160. The disaster recovery service platform 150 may, according to some embodiments, implement a Disaster Recovery ("DR") service, a Business Process Management ("BPM") engine, an orchestrator, a Cloud Platform Integration Module ("CPI"), a DataBase ("DB") module, a messaging module, a cloud connector module, etc. When a potential disaster is detected, the disaster recovery service platform 150 may access the appropriate information from the disaster recovery data store 110 to implement an appropriate DR process. The disaster recovery service platform 150 might be, for example, associated with a Personal Computers ("PC"), laptop computer, an enterprise server, a server farm, and/or a database or similar storage devices.

As used herein, devices, including those associated with the disaster recovery service platform 150 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks. According to some embodiments, an "automated" disaster recovery service platform 150 may move applications to a backup region. As used herein, the term "automated" may refer to, for example, actions that can be performed with little or no human intervention.

The disaster recovery service platform 150 may store information into and/or retrieve information from databases (e.g., the disaster recovery data store 110). The databases might be, for example, locally stored relational database or reside physically remote from the disaster recovery service platform 150. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical operator interface may provide an ability to access and/or modify elements of the system 100 via remote devices 160. The operator interface might, for example, let an operator or administrator analyze disaster recovery performance, manage disaster recovery creation and/or transitions, etc.

Note that any number of disaster recovery service platforms 150 might be included in the system 100. Moreover, various devices described herein might be combined according to embodiments of the present invention. For example, in some embodiments, the disaster recovery service platform 150 and a disaster recovery data store 110 might be co-located and/or may comprise a single apparatus. Moreover, the functions described herein might be implemented in a cloud-based environment and/or by a service provider (e.g., performing services for one or more enterprises, departments, or businesses).

Figure 2:
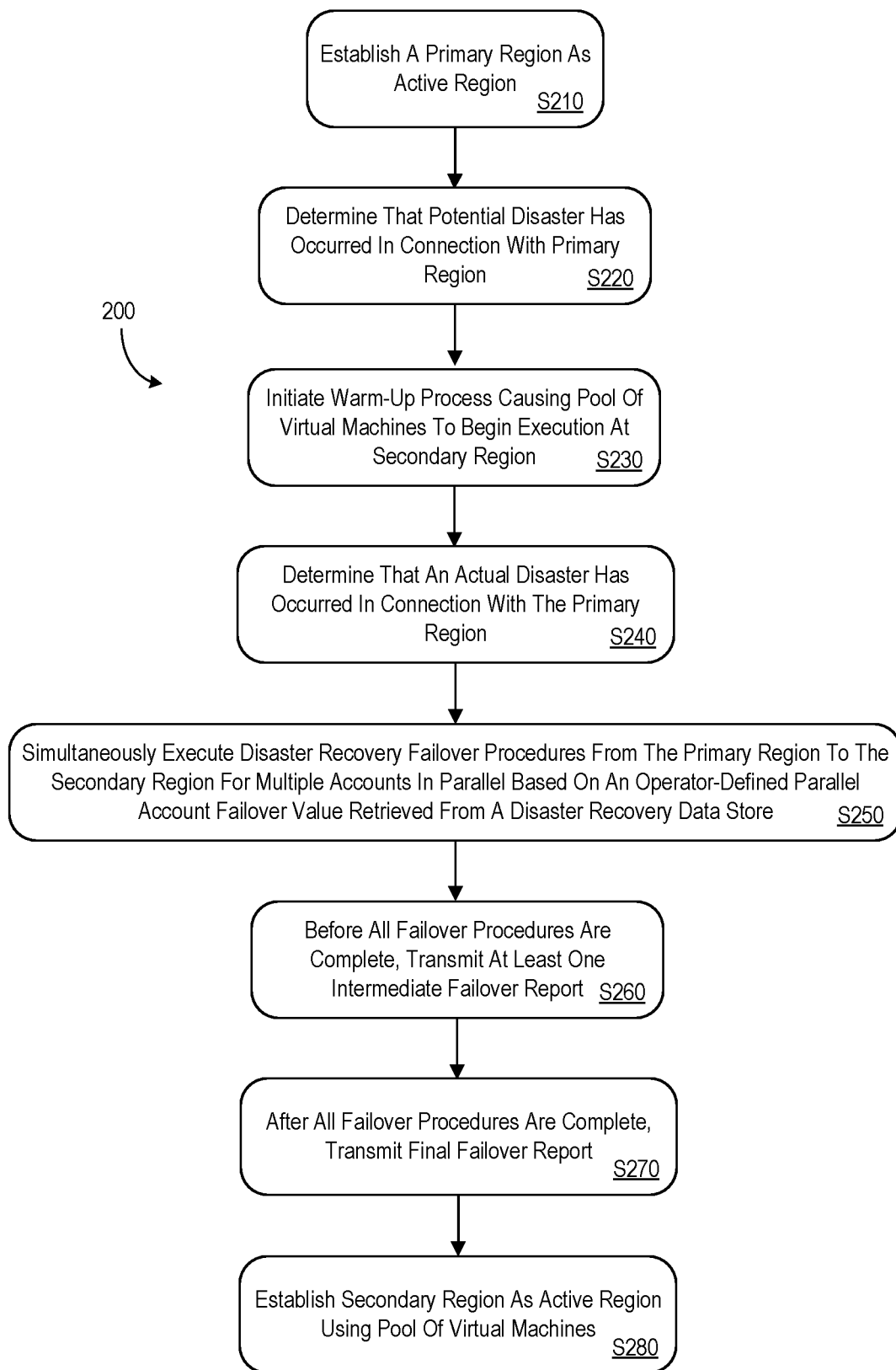
FIG. 2 illustrates a disaster recovery method in accordance with some embodiments.

FIG. 2 illustrates a disaster recovery method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a primary region of a cloud-based offering may be established as an "active" region (that is, the region that is currently executing applications for an enterprise). At S220, it may be determined that a potential disaster has occurred in connection with the primary region. This determination may be "preliminary" (e.g., the system might not yet be sure if a disaster did in fact occur). At S230, the system initiated a warm-up process causing a pool of virtual machines to begin execution at a secondary region.

At S240, the system may determine that an actual disaster has occurred in connection with the primary region (e.g., based on a number of failed virtual machines, a problem with response time, etc.). At S250, the system simultaneously executes disaster recovery failover procedures from the primary region to the secondary region for multiple accounts in parallel based on an operator-defined parallel account failover value retrieved from a disaster recovery data store. Before all failover procedures are complete, at S260, the system may transmit at least one intermediate failover report. At S270, after all failover procedures are complete, the system may transmit a final failover report establish the secondary region as the active region using the pool of virtual machines. At this point, the failover is complete.

To achieve KPI goals, a cloud platform DRP may utilize integration with relevant platform services and consist of two main elements:

(1) a procedure that has predefined steps (including decision-making); and
(2) an automated DR process that fully integrates the needed platform components so that enhanced DR customers can be "recovered" in a timely fashion and with minimal data loss.

Figure 3:
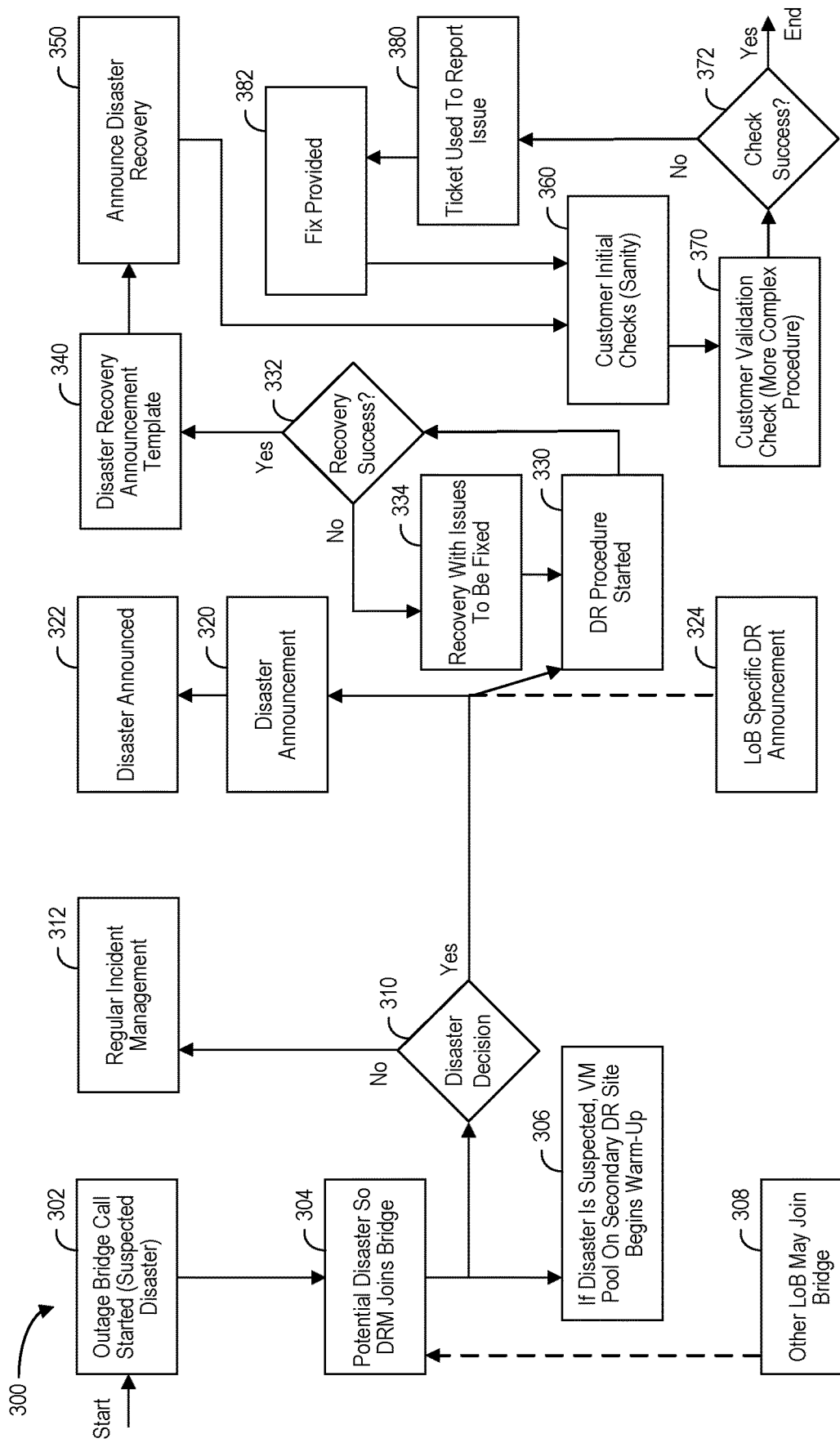
FIG. 3 is a disaster recovery process flow according to some embodiments.

FIG. 3 is a pre-defined disaster recovery process flow 300 according to some embodiments. The process flow starts when an outage bridge call is initiated 302 (e.g., in the case of a potential suspected disaster). As a result, Disaster Recovery Management may join the bridge 304 and a Virtual Machine ("VM") may begin a warm-up process 306 (at this point other Lines of Business ("LoB") may also join the bridge 308). If it is subsequently determined that no disaster occurred 310, a regular incident management process 312 may be performed.

If it is subsequently determined that a disaster did occur 310, a disaster announcement 320 may be prepared and issued 322 (e.g., via a system status page). According to some embodiments, the announcement 320 may include LoB specific DR information 324. The disaster determination 310 also results in the initiation of DR procedure 330. If the recovery was not successful 332, a recovery "with issues to be fixed" has occurred 334. If the recovery was successful 332, a disaster recovery announcement template 340 may be accessed and used to issue a disaster recovery announcement 350 (e.g., via a system status page).

After issuing the disaster recovery announcement 350, an initial customer sanity check may be performed 360 followed by a more complex validation check 370. If these checks 360, 370 are successful 372, the process is complete. If either check 360, 370 is not successful 372, a problem ticket is used to report the issue 360. After a fix is provided 382 in response to the ticket, the process may continue at 360 (the customer sanity check).

Thus, the DR process flow 300 performs all necessary steps to provide for the full restoration of a customer productive setup. In order to achieve this, a substantial amount of integration points may be implemented and the whole platform may act in alignment under the orchestration of an enhanced DR Service ("DRS"). Thus, one component in the enhanced recovery process of cloud platform integration—process integration may include a DRS that orchestrates an entire DR procedure. The procedure may be triggered, according to some embodiments, from a DRS operations cockpit (e.g., a DR operator may manually and consciously initiate the procedure after the disaster is declared. After that, a BPM engine may execute the needed steps unattended. As a result, all enhanced DR clients may have their stand-by setup activated and productively working within the RTO time. The BPM process may be associated with three parameters:

(1) "Primary Landscape" (landscape that failed);
(2) "Parallel Account Failovers" (how many accounts to process in parallel); and
(3) "Timeout" (how long to wait before determining that a failover of an account has failed.

These parameters may be passed through a DRS User Interface ("UI") or through a Representational State Transfer ("REST") call.

Figure 4:
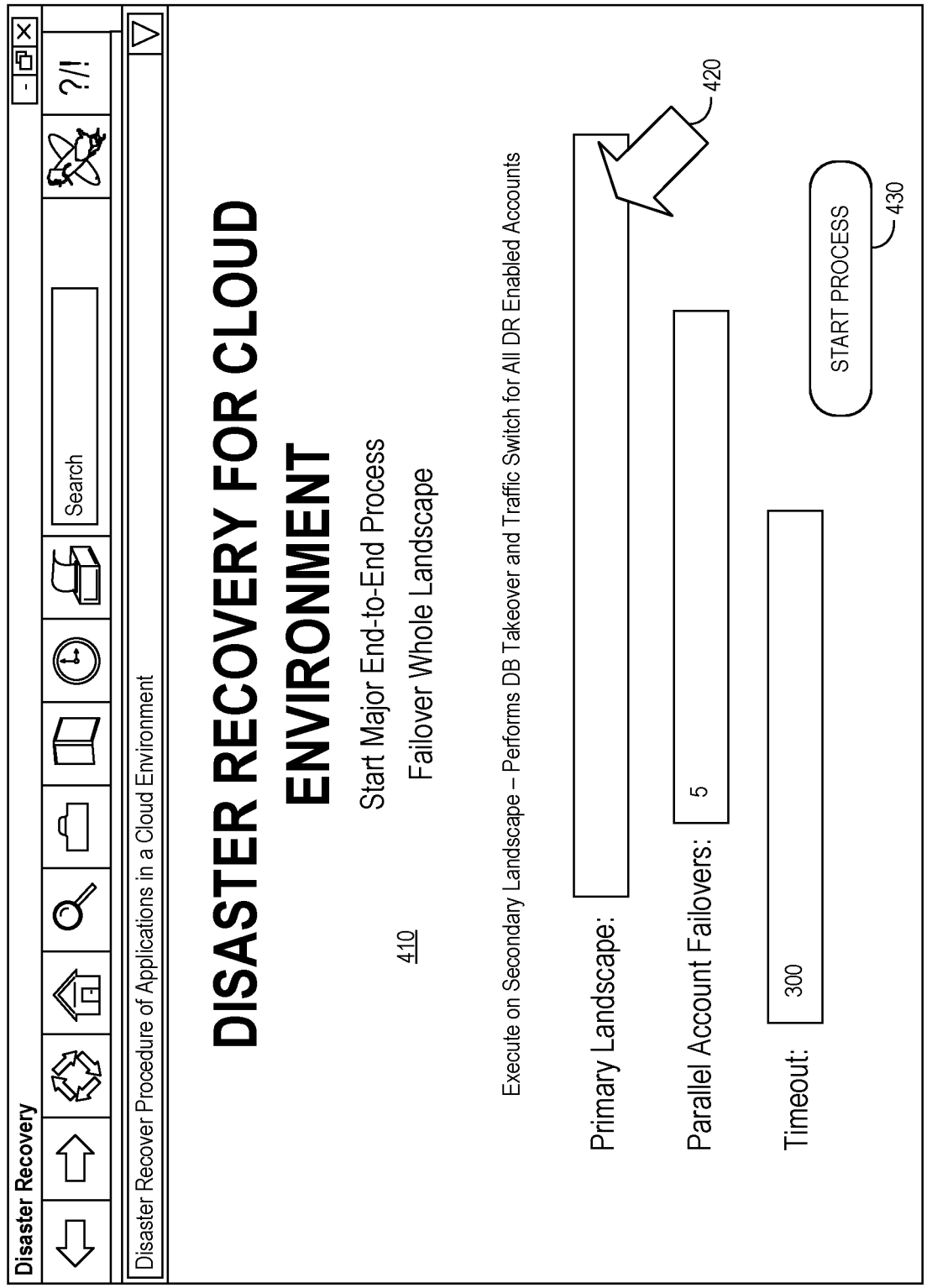
FIG. 4 is a failover user interface display in accordance with some embodiments.

FIG. 4 is a failover user interface display 400 in accordance with some embodiments. The display 400 includes an operator entry area 410 when a primary landscape identifier, a parallel account failover value, and a timeout period may be defined by an operator (e.g., via a keyboard, touchscreen, pull-down menus operated via a computer mouse pointer 420, etc.). Moreover, selection of a "Start Process" icon 340 may initiate an End-to-End ("E2E") failover process for a landscape.

Figure 5:
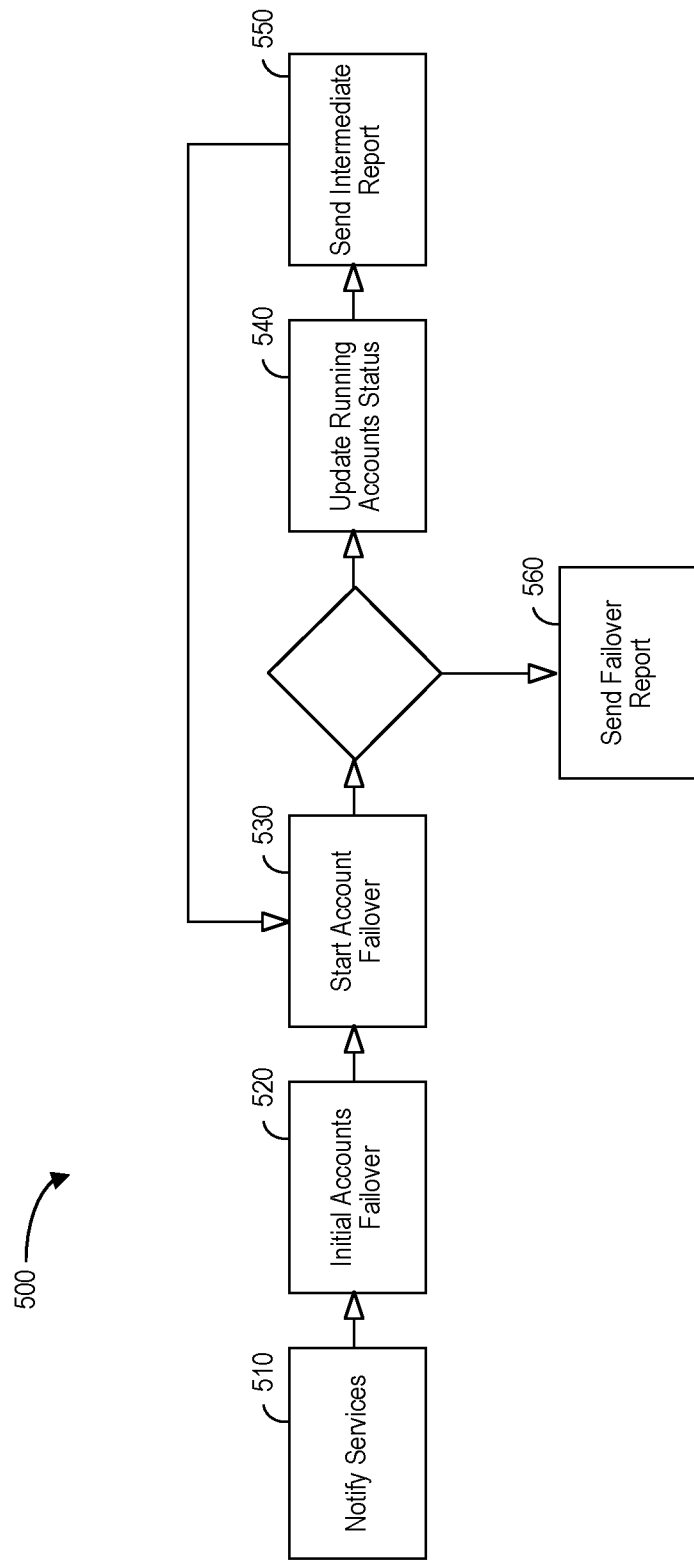
FIG. 5 is a business process management process according to some embodiments.

FIG. 5 is a business process management process 500 according to some embodiments. At 510, notify services may provide information to an initial account failover process 520. In particular, notify services 510 may send a notification through a messaging service to services that are subscribed to a particular topic when a failover of the landscape is initiated. According to some embodiments, the initial account process 520 may gather data for the accounts on which a failover needs to be executed. This starts an account failover process 530 that will update running accounts status 540 and send intermediate reports 550. The start accounts failover 530 may start failover processes in parallel for as many accounts as stated in the parallel account failovers parameter when starting the process. According to some embodiments, the update running accounts status 540 will update the list of accounts which are going to be failed over with a corresponding state of the failover (e.g., "Pending," "Running," "Success," "Failed," etc. Intermediate reports might comprise, for example, an email with the current state to a DR team email distribution list. When the process is complete, a final failover report is transmitted 560. That is, after failover is executed on all of the accounts, the flow 500 reaches the last step which is to send a failover report 560. This step might, for example, send a summary of the process execution to a DR team email distribution list.

The intermediate and failover reports may have similar structures such the one illustrated in FIG. 6 (showing an intermediate report 600 in accordance with some embodiments). In particular, the report 600 includes overall intermediate failover data 610 including: a primary landscape identifier, a secondary landscape identifier, a failover duration, an operator identifier, a failover process identifier, a total number of disaster recovery accounts, a number of successful accounts, a number of failed accounts, a number of timed-out accounts, a number of running accounts, a number of pending accounts, etc. The report 600 also includes an accounts summary 620 showing, for each account being migrated, an account identifier, a process identifier, a status, a running time, etc.

Another component in an enhanced recovery process of cloud platform integration might comprise an orchestrator. To prepare a DR datacenter, virtual machines may need to be prepared (e.g., started). Because virtual machine startup is relatively slow, there a step in a DR process might include a DR operator triggering a so called "warm-up" process. Once triggered, the "warm-up" may calculate all necessary virtual machine sizes and a corresponding count of the enhanced DR productive setups. With this information, the orchestrator module may begin to start the virtual machines as appropriate.

Another component in an enhanced recovery process of cloud platform integration might comprise a CPI module. The CPI module may connect cloud applications with other enterprise and non-enterprise cloud and on-premises applications. The CPI module may integrate processes and data in Application-to-Application ("A2A") and Business-to-Business ("B2B") scenarios. The DRS may support the CPI module by providing flexible application recovery when a disaster occurs.

When on-boarding a CPI application, an operator may specify if the application uses a messaging service. During recovery, the messaging service may be notified to activate messaging queues related to the application on the secondary landscape. All not consumed messages on the primary landscape before the disaster will therefore be available on the secondary landscape.

When on-boarding a CPI application, the operator might also specify if the application must be started on the secondary landscape during recovery. If the application handles HTTP traffic, it will be switched to the secondary landscape. If the application is used only as a worker node (and does not serve HTTP requests), it may instead be started on the secondary region during the recovery procedure.

Figure 7:
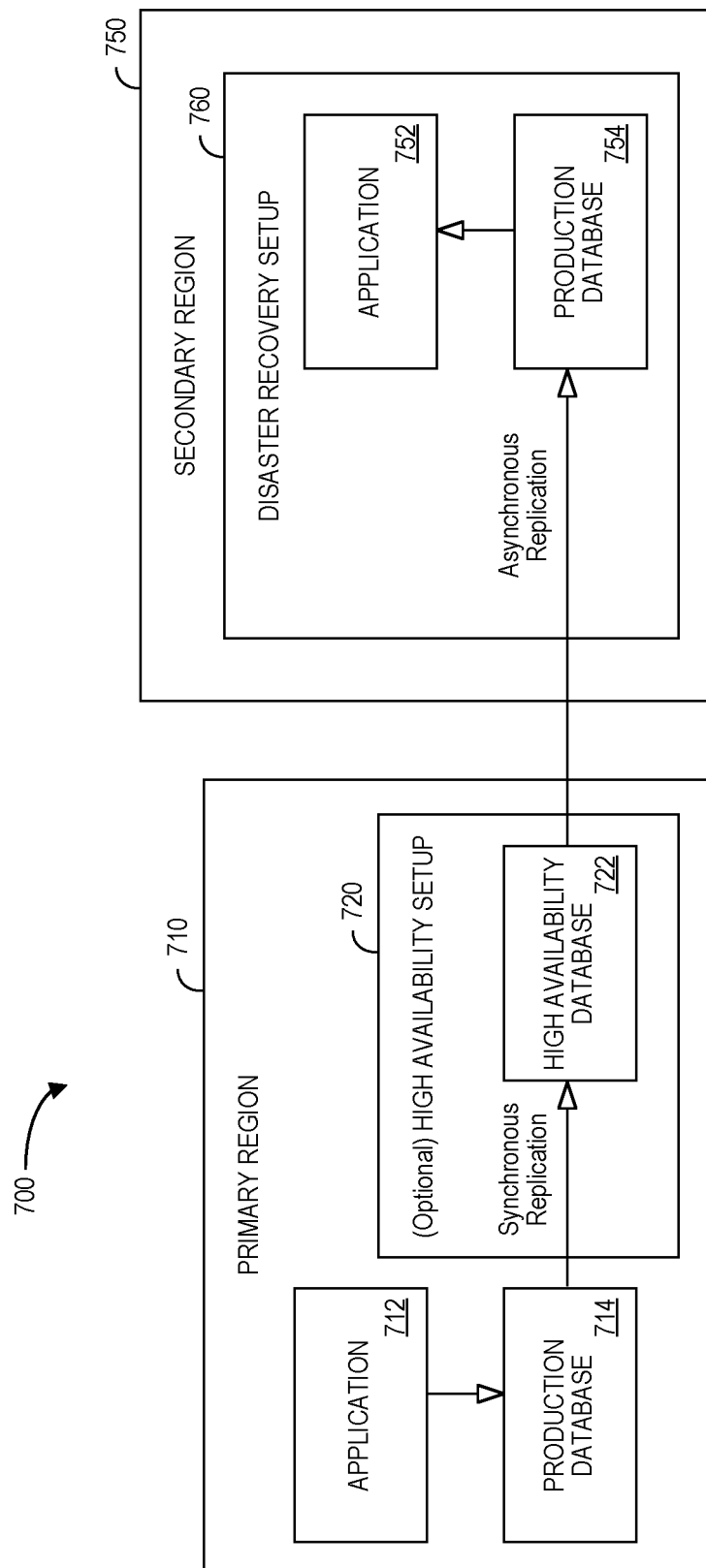
FIG. 7 is an example of a high availability and disaster recovery setup in accordance with some embodiments.

Another component in an enhanced recovery process of cloud platform integration might comprise a DB module. FIG. 7 is an example of a High Availability ("HA") and disaster recovery setup 700 in accordance with some embodiments. In particular, a primary region 710 includes an application 712 that accesses a production database 714. An optional HA setup 720 may use synchronous replication to update a high availability database 722. This can then be used, via asynchronous replication, to update a production database 754 accessed by an application 752 in a disaster recovery setup 760 of a secondary region 750.

In this way, the enhanced DRP may be integrated with the databases 714, 722, 754. During replication, the database 754 in the secondary region 750 is not accessible which means that the customer cannot read from or write data to the database 754. It may be necessary during a DRP (or a DR test) that the operation "takeover" is performed in connection with the corresponding DR instance of the database. This means that the DR DB instance 754 may need to become active and accessible so that the application 752 can continue working with this database 754 as a data source. Note that when the primary region 710 is recovered and a failback procedure is performed, all of the data that was written during this period on the secondary region 750 may be lost (because it will be overwritten by the asynchronous replication).

Figure 8:
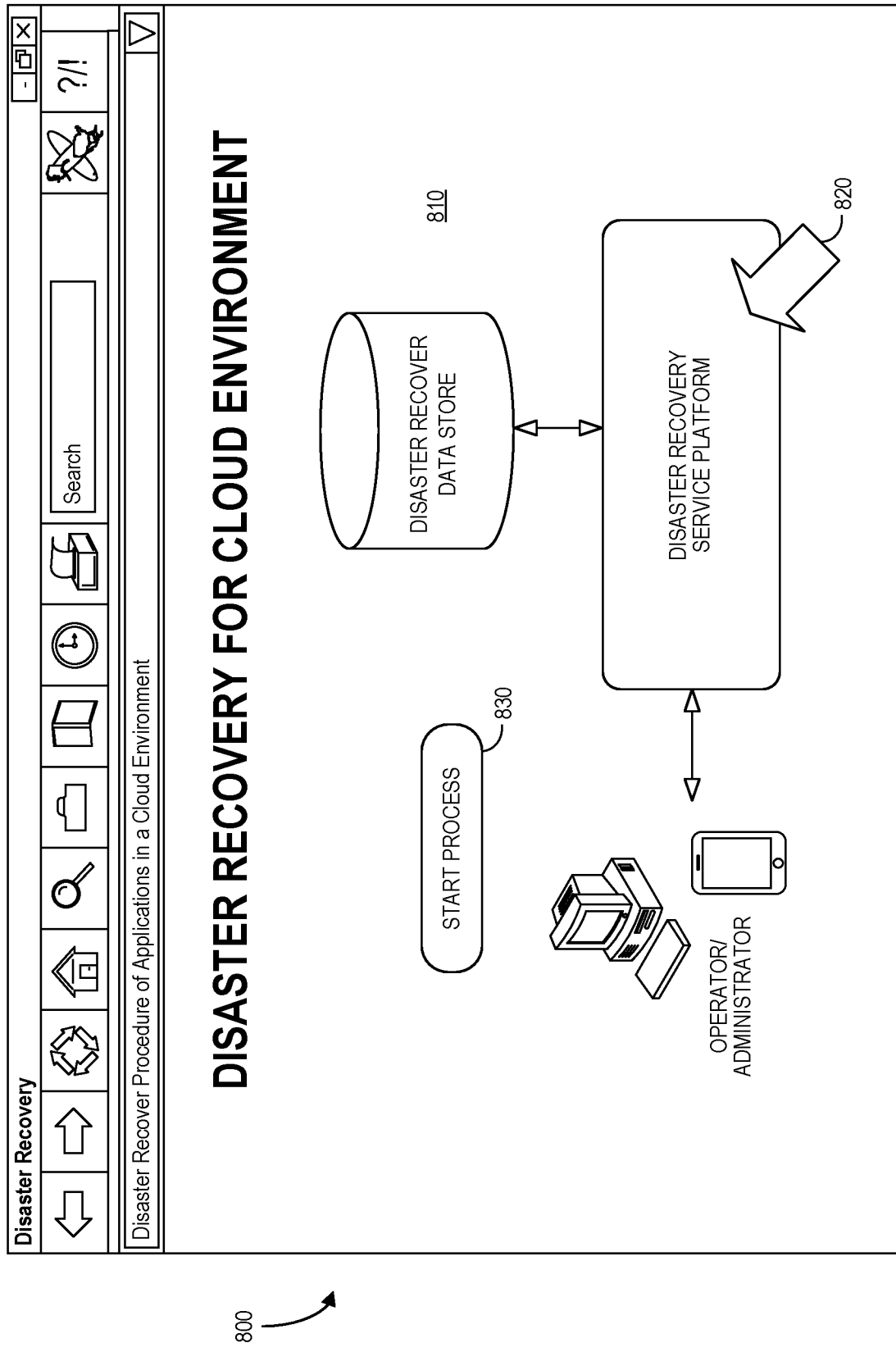
FIG. 8 is a user interface display according to some embodiments.

Note that an operator may arrange to monitor or adjust the operation of various aspects of a DR system, including models, specifications, templates, etc. For example, FIG. 8 is a user interface display 800 according to some embodiments. The display 800 may provide a graphical depiction 810 of a system (e.g., including a disaster recovery service platform, disaster recovery data store, etc.) to an operator and/or to provide an interactive interface allowing an operator to adjust system components as appropriate. Selection of an element on the display 800 (e.g., via a touchscreen or computer mouse pointer 820) may let the operator see more information about that particular element (e.g., in a pop-up window) and/or adjust operation of that element (e.g., by entering a new timeout period). According to some embodiments, selection of a "Start Process" icon 830 by an operator may initiate the implementation of a DR package or solution.

Figure 9:
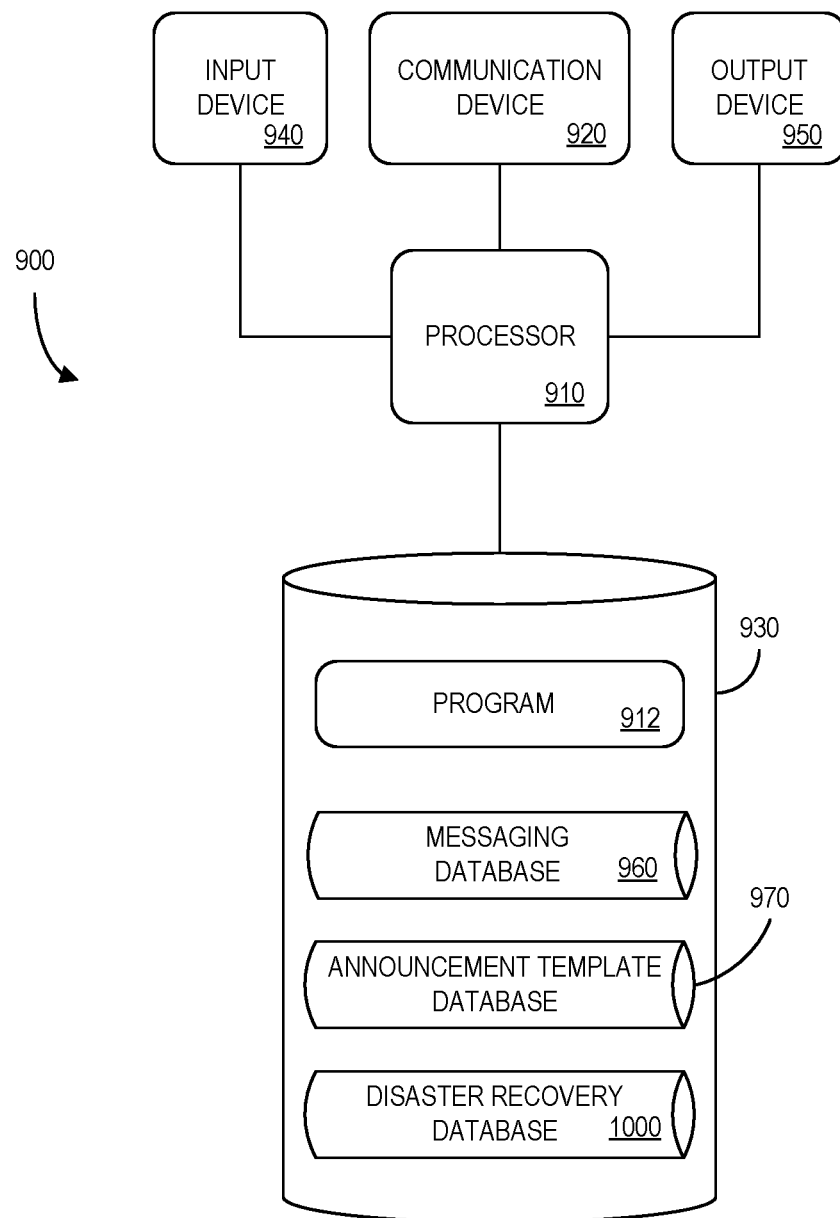
FIG. 9 is a high-level diagram of an apparatus or platform in accordance with some embodiments.

The embodiments described herein may be implemented using any of a number of different computer hardware implementations. FIG. 9 is a block diagram of apparatus 900 according to some embodiments (e.g., the system 100 of FIG. 1). The apparatus 900 may comprise a general-purpose computing apparatus and may execute program code to perform any of the functions described herein. The apparatus 900 may include other unshown elements according to some embodiments. According to some embodiments, the apparatus 900 includes a processor 910 operatively coupled to a communication device 920, a data storage device 930, one or more input devices 940, and/or one or more output devices 950. The communication device 920 may facilitate communication with external devices, such as remote user or administrator devices. The input device(s) 940 may comprise, for example, a keyboard, a keypad, a mouse or other pointing device, a microphone, knob or a switch, an Infra-Red ("IR") port, a docking station, and/or a touch screen. The input device(s) 940 may be used, for example, to enter information into the apparatus 900 (e.g., about failover processes, timeout periods, etc.). The output device(s) 950 may comprise, for example, a display (e.g., a display screen) a speaker, and/or a printer (e.g., to provide disaster recovery status to an operator, summary analytic reports, troubleshooting information, etc.).

The data storage device 930 may comprise any appropriate persistent storage device, including combinations of magnetic storage devices (e.g., magnetic tape, hard disk drives and flash memory), optical storage devices, Read Only Memory ("ROM") devices, etc., while the memory 960 may comprise Random Access Memory ("RAM").

The program code 912 may be executed by the processor 910 to cause the apparatus 900 to perform any one or more of the processes described herein. Embodiments are not limited to execution of these processes by a single apparatus. The data storage device 930 may also store data and other program code for providing additional functionality and/or which are necessary for operation thereof, such as device drivers, Operating System ("OS") files, etc. For example, the processor 910 may access a disaster recovery data store that contains an operator-defined parallel account failover value. The processor 910 may establish a primary region as an active region and determine that a potential disaster has occurred in connection with the primary region. A warm-up process may be initiated causing a pool of virtual machines to begin execution at a secondary region. The processor 910 may then determine that an actual disaster has occurred in connection with the primary region and simultaneously execute disaster recovery failover procedures from the primary region to the secondary region for multiple accounts in parallel based on the operator-defined parallel account failover value. Before all failover procedures are complete, the processor 910 may transmit at least one intermediate failover report. After all failover procedures are complete, the processor 910 may transmit a final failover report and establish the secondary region as the active region using the pool of virtual machines.

In some embodiments (such as shown in FIG. 9), the storage device 930 further stores a messaging database 960 (e.g., containing subscription messages or health check messages), an announcement template database 970 (to store templates for commonly used disaster and/or recovery announcements), and a disaster recovery database 1000. An example of a database that may be used in connection with the apparatus 900 will now be described in detail with respect to FIG. 10. Note that the database described herein is only one example, and additional and/or different information may be stored therein. Moreover, various databases might be split or combined in accordance with any of the embodiments described herein.

Figure 10:
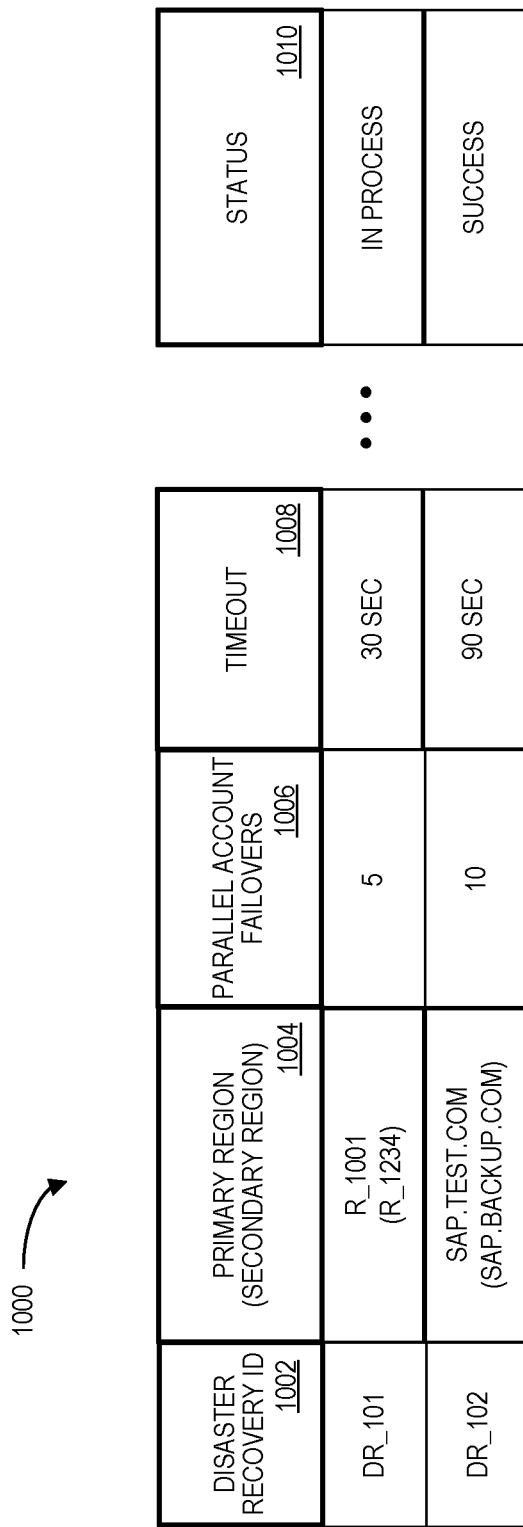
FIG. 10 is a portion of a disaster recovery database according to some embodiments.

Referring to FIG. 10, a table is shown that represents the disaster recovery database 1000 that may be stored at the apparatus 900 according to some embodiments. The table may include, for example, entries identifying operator-defined settings for an enhanced DR process that moves applications from a first region to a second region. The table may also define fields 1002, 1004, 1006, 1008, 1010 for each of the entries. The fields 1002, 1004, 1006, 1008, 1010 may, according to some embodiments, specify: a disaster recovery identifier 1002, primary and secondary region identifiers 1004, a parallel account failover value 1106, a timeout value 1108, and a status 1010. The disaster recovery database 1000 may be created and updated, for example, based on information received from an operator, an enhanced DR process, etc.

The disaster recovery identifier 1002 may be, for example, a unique alphanumeric code identifying particular operator-defined settings for an enhanced DR process that moves applications from a first region to a second region. The primary and secondary region identifiers 1004 might define the failover situation. The parallel account failover value 1106 might indicate how many accounts will be moved in parallel (thus increasing the DR speed and improving system performance). The timeout value 1108 indicates when an account should be considered "failed." The status 1010 might indicate that a disaster recovery is currently in process, successfully completed, an error occurred, etc.

Figure 11:
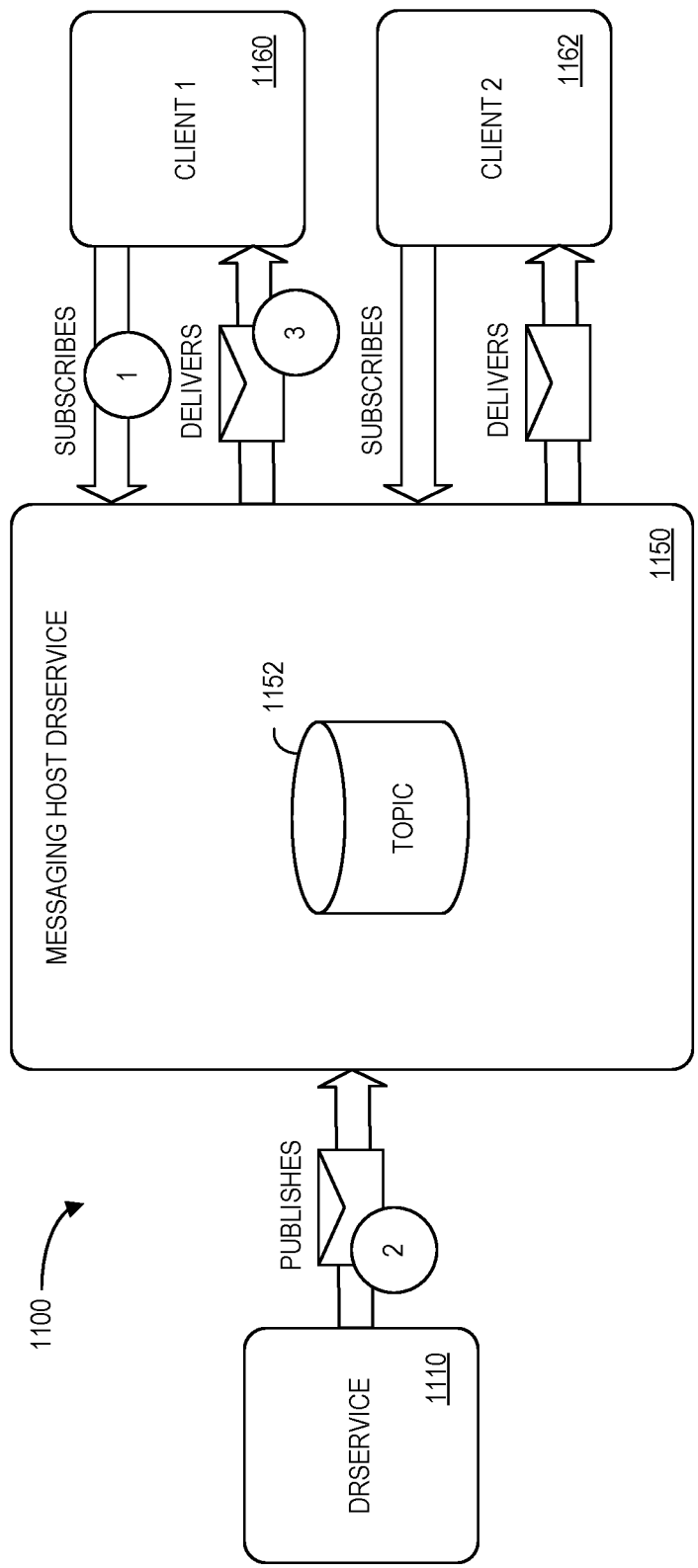
FIG. 11 illustrates the use of messaging for a primary or secondary region in accordance with some embodiments.

FIG. 11 illustrates the use of messaging 1100 for a primary or secondary region in accordance with some embodiments. At (1), a first client 1160 may subscribe to one or more topics 1152 in a messaging host DR service 1150. When a DR service 1110 publishes a message corresponding to the subscribed topic at (2), the messaging host DR service 1150 arranges to deliver the message to the first client 1160. If a second client 1162 did not subscribe to that topic, it would not receive the message. In this way, an enhanced DR service may use messages for both notifications and communication between landscapes. As a result, the message module may notify components about subscribed services for specific events like failover via publication/subscription mechanism.

Figure 12:
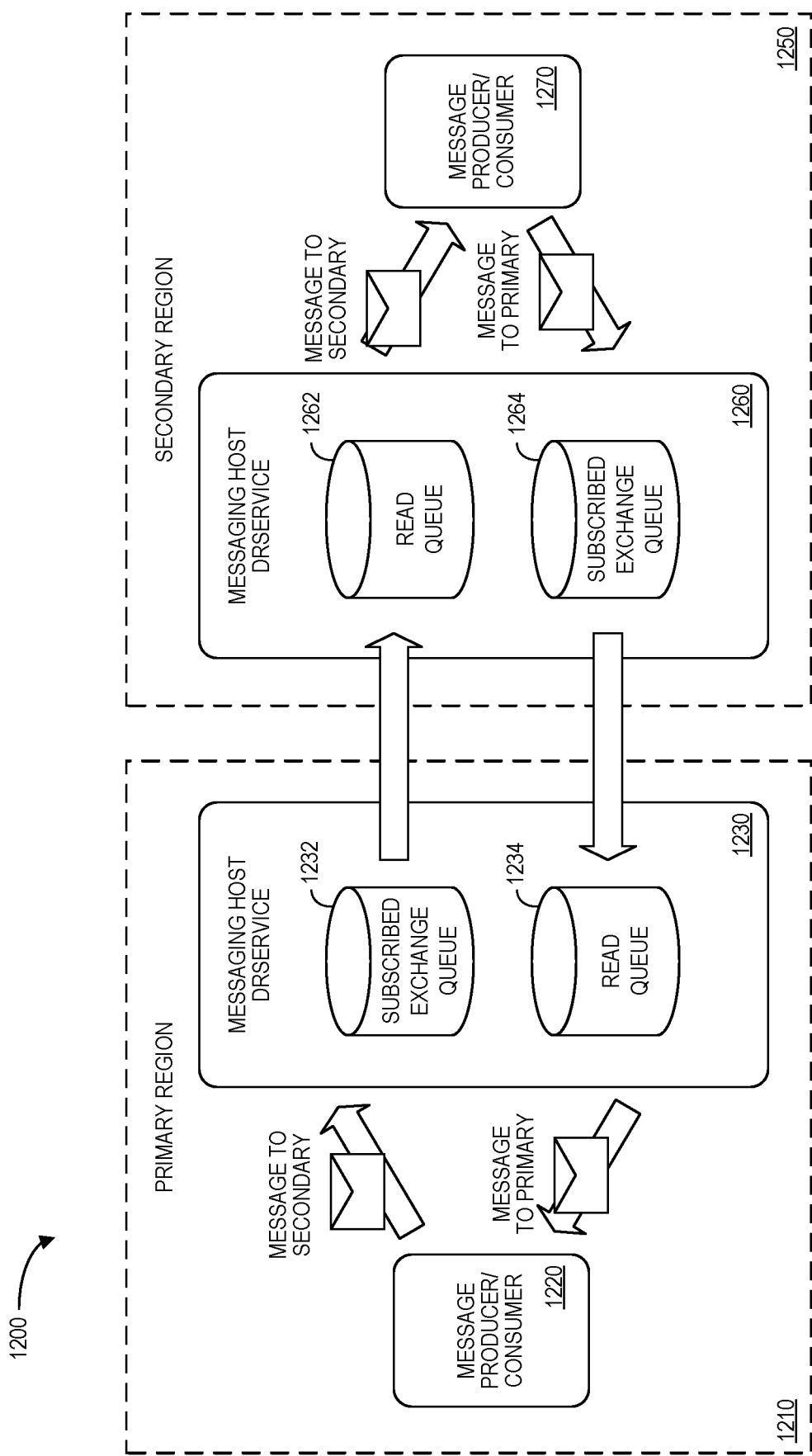
FIG. 12 illustrates the use of messaging to transport account metadata according to some embodiments.

In other embodiments, the messaging service is used to implement communication between DR services for primary and secondary regions (cross region communication). FIG. 12 illustrates the use of messaging 1200 to transport account metadata according to some embodiments (e.g., in connection with a replication service). A message producer/consumer 1220 in a primary region 1210 may send a message to a message producer/consumer 1270 in a secondary region 1250. In particular, the message is transmitted from a subscribed exchange queue 1232 in a messaging host DR service 1230 of the primary region 1210 to a read queue 1262 in a messaging host DR service 1260 of the secondary region 1250. Similarly, the message producer/consumer 1270 in the secondary region 1250 may send a message to the message producer/consumer 1220 in the primary region 1210. In this case, the message is transmitted from a subscribed exchange queue 1264 in the messaging host DR service 1260 of the secondary region 1250 to a read queue 1234 in the messaging host DR service 1230 of the primary region 1210. In this service, messaging may be used to transport account metadata from the primary region 1210 to the secondary region 1250.

Figure 13:
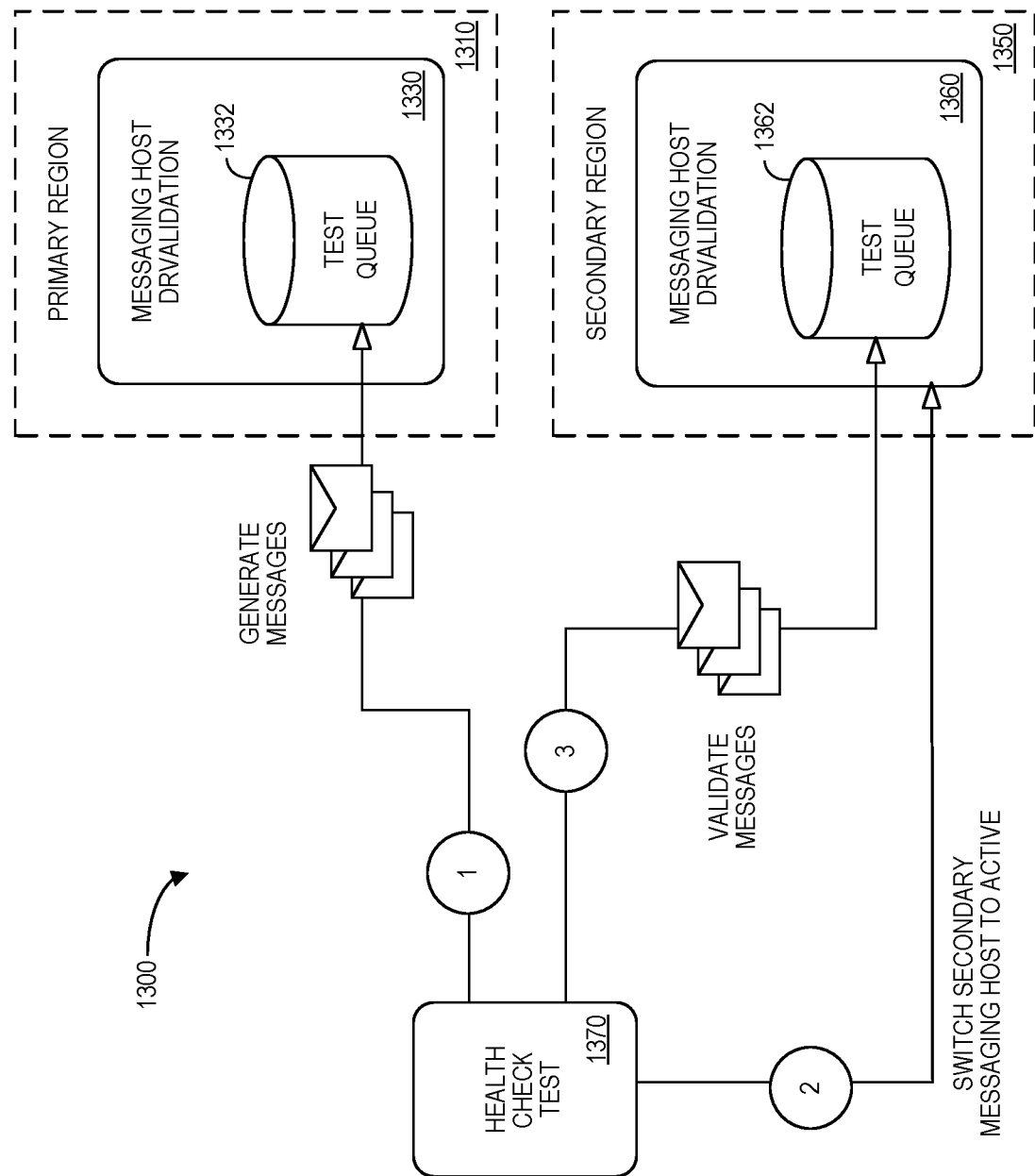
FIG. 13 illustrates a health check test in accordance with some embodiments.

FIG. 13 illustrates a health check test 1300 in accordance with some embodiments. At (1), a health check test 1370 generates messages that are stored in a test queue 1332 of a messaging host DR validation 1330 of a primary region 1310. At (2), the health check test 1270 switches a secondary messaging host to active (e.g., by executing a call to a messaging service Application Programming Interface ("API")). Finally, at (3) the health check test 1370 generates validation messages that are stored in a test queue 1362 of a messaging host DR validation 1360 of the secondary region 1350. This way, the validation message may be compared to the original message to ensure that they are identical (thus verifying the health of the system). As a result, the health check test 1370 uses messaging to check the replication of the sent messages to queues 1332, 1362. Validation of whether the generated messages are replicated to the secondary region may, according to some embodiments, including comparing timestamps of the generated and replicated messages. The health check test 1370 may also execute account on/off boarding using the established communication between DR service in the primary and secondary regions 1310, 1350.

Figure 14:
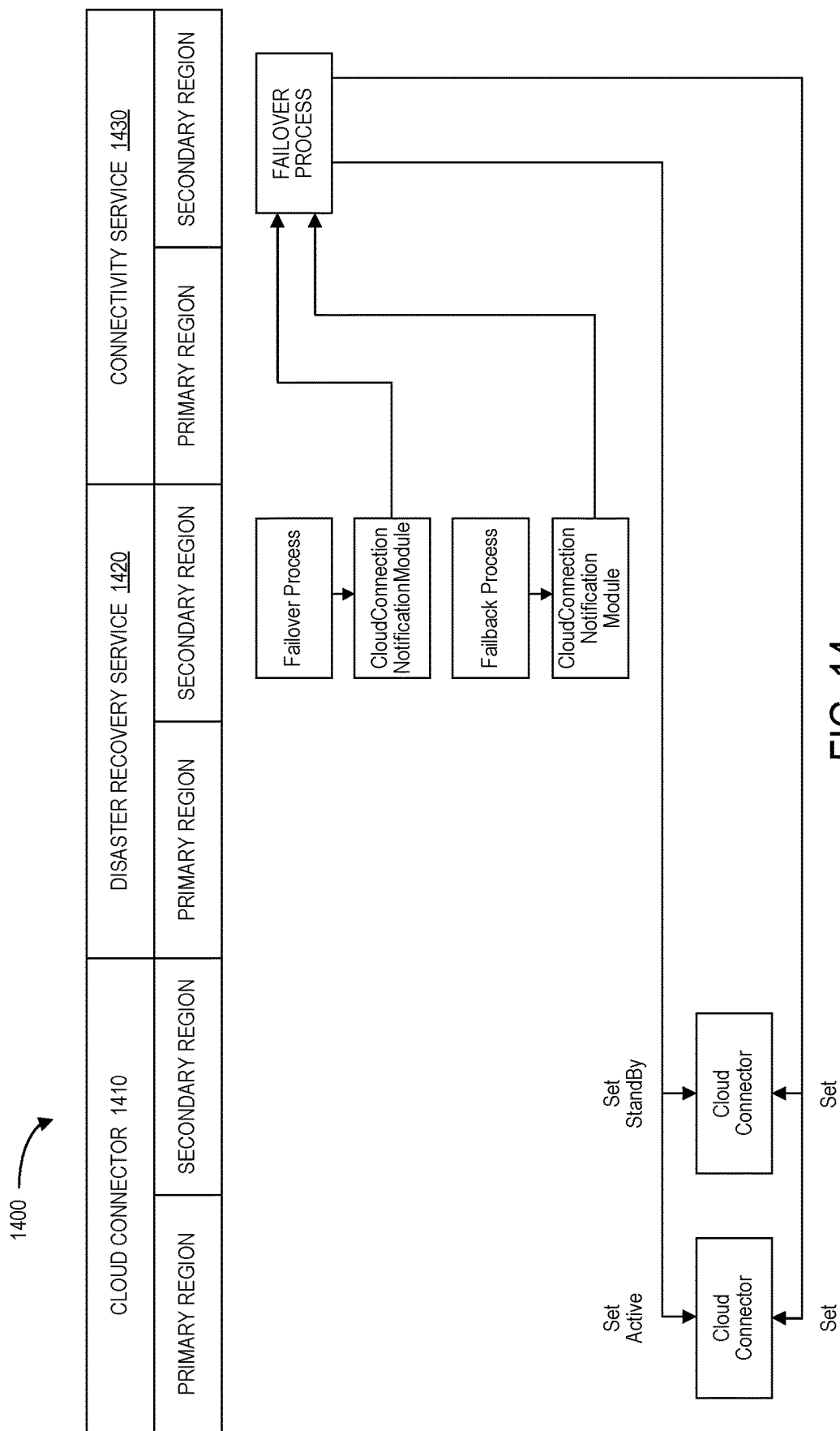
FIG. 14 is a flow diagram associated with a cloud connector module according to some embodiments.

Another component in an enhanced recovery process of cloud platform integration might comprise a cloud connector module. FIG. 14 is a flow diagram 1400 associated with a cloud connector module according to some embodiments. The flow diagram 1400 illustrates actions performed by a cloud connector 1410, a DR service 1420, and a connectivity service 1430 (each broken down into actions by the primary and secondary landscapes). For clients that use cloud connector 1410 in order to connect their on-premise systems to the cloud, it may be necessary to develop a mechanism to also switch the cloud connector in case of disaster. To make the cloud connector switch available, a subaccount of the client which is DR onboarded may be registered in the cloud connector. The region host may be set to the URL of the primary region (e.g., hana.ondemand.com). After that, the configuration of the DR may be created and for the region host should be entered the secondary region (e.g., eu3.hana.ondemand.com).

The DR service 1420 secondary region may initiate a failover process, and a cloud connection notification module may transfer via a connectivity service 1430 failover process (with a notification agent) such that the primary region is set as "standby" for the cloud connector 1410 while the secondary region is set as "active." To revert to the original configuration, the DR service 1420 secondary region may initiate a failback process, and a cloud connection notification module may transfer via a connectivity service 1430 failover process (with a notification agent) such that the primary region is set as "active" for the cloud connector 1410 while the secondary region is set as "Standby."

Thus, embodiments may define an enhanced DR process that provides both a relatively short RTO along with a minimal RPO.

Figure 15:
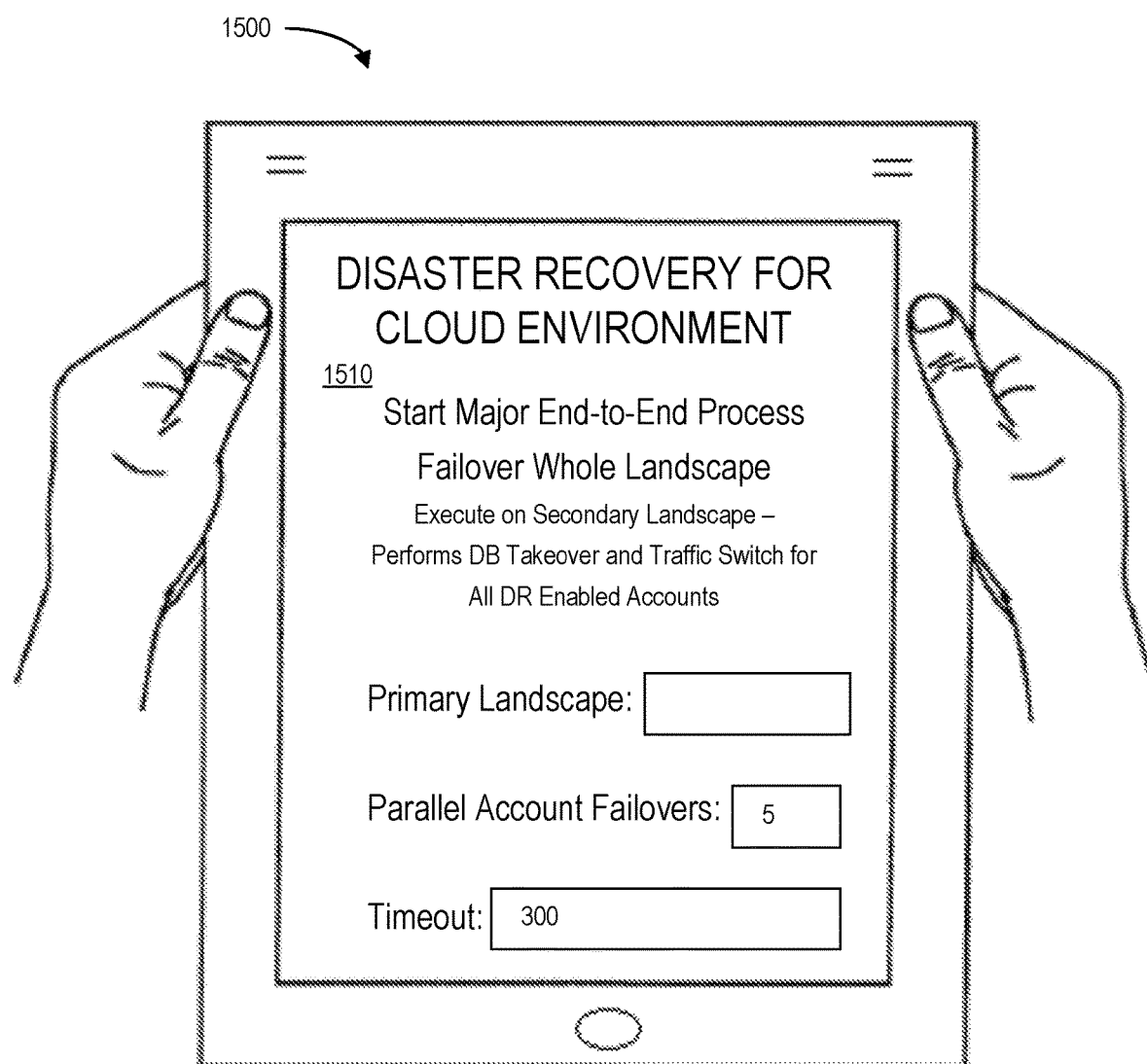
FIG. 15 illustrates a handheld tablet computer in accordance with some embodiments.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the discussed architectures may include a processor to execute program code such that the computing device operates as described herein. Moreover, the displays described are provided only as examples and other types of displays might be implemented. For example, FIG. 15 shows a handheld tablet computer 1500 in accordance with some embodiments. A display 1510 might provide information about implementing DR for a cloud computing environment and one or more icons may be selected by the user to adjust operation of the system (e.g., by setting a timeout value, parallel account failover value, etc.).

All systems and processes discussed herein may be embodied in program code stored on one or more non-transitory tangible computer-readable media. Such media may include, for example, a floppy disk, a CD-ROM, a DVD-ROM, a Flash drive, magnetic tape, and solid-state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system associated with disaster recovery from a primary region to a secondary region of a cloud landscape, comprising:
   (a) a disaster recovery data store containing a plurality of electronic records including an operator-defined parallel account failover value; and
   (b) a disaster recovery service platform, coupled to the disaster recovery data store, adapted to:
      (i) establish the primary region as an active region,
      (ii) determine that a suspected potential disaster has occurred in connection with the primary region before an actual disaster is confirmed,
      (iii) responsive to said determination, initiate a warm-up process causing a pool of virtual machines to begin execution at the secondary region before the actual disaster is confirmed, (iv) confirm that the actual disaster has occurred in connection with the primary region, (v) responsive to said confirmation, simultaneously execute disaster recovery failover procedures from the primary region to the secondary region for multiple accounts in parallel based on the operator-defined parallel account failover value, (vi) after the disaster recovery failover procedures begin to execute and before all of the failover procedures are complete, transmit at least one intermediate failover report, (vii) after all of the failover procedures are complete, transmit a final failover report, and (viii) after all of the failover procedures are complete, establish the secondary region as the active region using the pool of virtual machines.

2. The system of claim 1, wherein the disaster recovery data store further includes an operator-defined timeout value.

3. The system of claim 2, wherein a disaster recovery failover procedure for an account is categorized as "failed" when it executes longer than the operator-defined timeout value.

4. The system of claim 1, wherein services that subscribe to a predetermined topic receive a notification via a messaging service when the disaster recovery failover procedures are executed.

5. The system of claim 1, wherein the intermediate failover report includes at least one of: (i) a primary landscape identifier, (ii) a secondary landscape identifier, (iii) a failover duration, (iv) an operator identifier, (v) a failover process identifier, (vi) a total number of disaster recovery accounts, (vii) a number of successful accounts, (viii) a number of failed accounts, (ix) a number of timed-out accounts, (x) a number of running accounts, and (xi) a number of pending accounts.

6. The system of claim 1, wherein the warm-up process includes a calculation of a number of virtual machines in the pool.

7. The system of claim 1, wherein a health check test uses messaging to check the replication of sent messages to a queue.

8. A method associated with disaster recovery from a primary region to a secondary region of a cloud landscape, comprising:

establishing the primary region as an active region;

determining that a suspected potential disaster has occurred in connection with the primary region before an actual disaster is confirmed;

responsive to said determination, initiating a warm-up process causing a pool of virtual machines to begin execution at the secondary region before the actual disaster is confirmed;

confirming that the actual disaster has occurred in connection with the primary region;

responsive to said confirmation, simultaneously executing disaster recovery failover procedures from the primary region to the secondary region for multiple accounts in parallel based on an operator-defined parallel account failover value retrieved from a disaster recovery data store;

after the disaster recovery failover procedures begin to execute and before all of the failover procedures are complete, transmitting at least one intermediate failover report;

after all of the failover procedures are complete, transmitting a final failover report; and after all of the failover procedures are complete, establishing the secondary region as the active region using the pool of virtual machines.

9. The method of claim 8, wherein the disaster recovery data store further includes an operator-defined timeout value.

10. The method of claim 9, wherein a disaster recovery failover procedure for an account is categorized as "failed" when it executes longer than the operator-defined timeout value.

11. The method of claim 8, wherein services that subscribe to a predetermined topic receive a notification via a messaging service when the disaster recovery failover procedures are executed.

12. The method of claim 8, wherein the intermediate failover report includes at least one of: (i) a primary landscape identifier, (ii) a secondary landscape identifier, (iii) a failover duration, (iv) an operator identifier, (v) a failover process identifier, (vi) a total number of disaster recovery accounts, (vii) a number of successful accounts, (viii) a number of failed accounts, (ix) a number of timed-out accounts, (x) a number of running accounts, and (xi) a number of pending accounts.

13. The method of claim 8, wherein the warm-up process includes a calculation of a number of virtual machines in the pool.

14. The method of claim 8, wherein a health check test uses messaging to check the replication of sent messages to a queue.

15. A non-transitory, computer-readable medium storing program code, the program code executable by a computer processor to cause the processor to perform a method associated with disaster recovery from a primary region to a secondary region of a cloud landscape, the method comprising:

establishing the primary region as an active region;

determining that a suspected potential disaster has occurred in connection with the primary region before an actual disaster is confirmed;

responsive to said determination, initiating a warm-up process causing a pool of virtual machines to begin execution at the secondary region before the actual disaster is confirmed;

if it is confirmed that the actual disaster has occurred in connection with the primary region, then:

(i) responsive to said confirmation of disaster, simultaneously executing disaster recovery failover procedures from the primary region to the secondary region for multiple accounts in parallel based on an operator-defined parallel account failover value retrieved from a disaster recovery data store, (ii) after the disaster recovery failover procedures begin to execute and before all of the failover procedures are complete, transmitting at least one intermediate failover report, (iii) after all of the failover procedures are complete, transmitting a final failover report, and (iv) after all of the failover procedures are complete, establishing the secondary region as the active region using the pool of virtual machines; and if it confirmed that no actual disaster has occurred in connection with the primary region, then:

(i) responsive to said confirmation of no disaster, performing a regular incident management process.

16. The medium of claim 15, wherein the disaster recovery data store further includes an operator-defined timeout value.

17. The medium of claim 16, wherein a disaster recovery failover procedure for an account is categorized as "failed" when it executes longer than the operator-defined timeout value.

18. The medium of claim 15, wherein services that subscribe to a predetermined topic receive a notification via a messaging service when the disaster recovery failover procedures are executed.

19. The medium of claim 15, wherein the intermediate failover report includes at least one of: (i) a primary landscape identifier, (ii) a secondary landscape identifier, (iii) a failover duration, (iv) an operator identifier, (v) a failover process identifier, (vi) a total number of disaster recovery accounts, (vii) a number of successful accounts, (viii) a number of failed accounts, (ix) a number of timed-out accounts, (x) a number of running accounts, and (xi) a number of pending accounts.

20. The medium of claim 15, wherein the warm-up process includes a calculation of a number of virtual machines in the pool.

21. The medium of claim 15, wherein a health check test uses messaging to check the replication of sent messages to a queue.

* * * * *